United States Patent
Vakanski et al.

(10) Patent No.: US 10,112,303 B2
(45) Date of Patent: Oct. 30, 2018

(54) IMAGE-BASED TRAJECTORY ROBOT PROGRAMMING PLANNING APPROACH

(71) Applicants: Aleksandar Vakanski, Idaho Falls, ID (US); Farrokh Janabi-Sharifi, North York (CA)

(72) Inventors: Aleksandar Vakanski, Idaho Falls, ID (US); Farrokh Janabi-Sharifi, North York (CA)

(*) Notice: Subject to any disclaimer, the term of this patent is extended or adjusted under 35 U.S.C. 154(b) by 0 days.

(21) Appl. No.: 15/031,779

(22) PCT Filed: Oct. 21, 2014

(86) PCT No.: PCT/CA2014/051016
§ 371 (c)(1),
(2) Date: Apr. 25, 2016

(87) PCT Pub. No.: WO2015/058297
PCT Pub. Date: Apr. 30, 2015

(65) Prior Publication Data
US 2016/0243704 A1    Aug. 25, 2016

Related U.S. Application Data

(60) Provisional application No. 61/895,721, filed on Oct. 25, 2013.

(51) Int. Cl.
*B25J 9/16* (2006.01)

(52) U.S. Cl.
CPC .......... *B25J 9/1697* (2013.01); *B25J 9/1664* (2013.01); *G05B 2219/36436* (2013.01);
(Continued)

(58) Field of Classification Search
CPC ...... B25J 9/1697; B25J 9/1664; B25J 9/1694; B25J 13/084; G05B 2219/36436;
(Continued)

(56) References Cited

U.S. PATENT DOCUMENTS 4,380,696 A    4/1983  Masaki
5,572,102 A *  11/1996 Goodfellow ........... B25J 9/1697
                                                            219/124.1
(Continued)

FOREIGN PATENT DOCUMENTS

CA           2150844 A1    8/1996

OTHER PUBLICATIONS

International Search Report dated Feb. 4, 2015 in related International Patent Application No. PCT/CA2014/051016.
(Continued)

*Primary Examiner* — Bao Long T Nguyen
(74) *Attorney, Agent, or Firm* — Eric L. Lane; Green Patent Law

(57) ABSTRACT

A method of programming at least one robot by demonstration comprising: performing at least one demonstration of at least one task in the Held of view of at least one fixed camera to obtain at least one observed task trajectory of at least one manipulated object, preferably at least one set of observed task trajectories; generating a generalized task trajectory from said at least one observed task trajectory, preferably from said at least one set of observed task trajectories; and executing said at least one task by said at least one robot in the field of view of said at least one fixed camera, preferably using image-based visual servoing to minimize the difference between the executed trajectory during said execution and the generalized task trajectory.

18 Claims, 12 Drawing Sheets

(52) U.S. Cl.
CPC .......... *G05B 2219/36442* (2013.01); *G05B 2219/39393* (2013.01); *G05B 2219/40116* (2013.01); *G05B 2219/40607* (2013.01)

(58) Field of Classification Search
CPC .......... G05B 2219/36442; G05B 2219/39393; G05B 2219/40116; G05B 2219/40607; G05B 19/19; G05B 19/416; G05B 19/42; G05B 2219/39391; G05B 2219/39395; Y10S 901/03; Y10S 901/47
USPC ..... 700/259; 901/3, 47; 318/568.13, 568.16, 318/568.18; 382/153
See application file for complete search history.

(56) References Cited

U.S. PATENT DOCUMENTS

| | | | |
|---|---|---|---|
| 6,328,523 B1 | 12/2001 | Watanabe et al. | |
| 8,583,313 B2* | 11/2013 | Mian | G05D 1/0229 700/245 |
| 2011/0106311 A1 | 5/2011 | Nakajima et al. | |
| 2012/0123589 A1* | 5/2012 | Kim | B25J 9/1612 700/254 |
| 2012/0294509 A1* | 11/2012 | Matsumoto | B25J 5/007 382/153 |
| 2013/0041508 A1 | 2/2013 | Hu et al. | |
| 2013/0158711 A1* | 6/2013 | Smith | B25J 9/1694 700/259 |
| 2015/0094855 A1* | 4/2015 | Chemouny | G05B 19/423 700/259 |
| 2015/0328778 A1* | 11/2015 | Keese | B25J 11/006 83/14 |

OTHER PUBLICATIONS

Written Opinion dated Feb. 4, 2015 in related International Patent Application No. PCT/CA2014/051016.
International Preliminary Report on Patentability dated Apr. 26, 2016 in related International Patent Application No. PCT/CA2014/051016.

* cited by examiner

IMAGE-BASED TRAJECTORY ROBOT PROGRAMMING PLANNING APPROACH

FIELD OF THE INVENTION

This invention relates to robots and more particularly to image-based trajectory planning in robot programming by demonstration.

BACKGROUND OF THE INVENTION

Robot Programming by Demonstration (PbD) is a recent trend in robotics, employed to transfer new skills to robots from observations of tasks demonstrated by humans or other robots. A typical robot PbD learning process consists of observing the demonstrations (task perception step), followed by task modeling and planning steps, leading to task execution by the robot learner (also called task reproduction step). Perception of the demonstration(s) can be done using different types of sensors, for example vision sensors, electromagnetic sensors, inertial sensors, or when a robot is employed for demonstrating a task, joint (sometime referred to as articulations) measurements of the robot can be employed for task perception.

Despite the applicability of different types of sensors for task perception, vision sensors, such as cameras, are of particular interest due to the non-intrusive character of the vision-based measurements.

Remote fixed cameras have been employed in the past for robots' teaching by demonstration. For example, visual PbD can be used to reproduce human action with a robot, having a fixed camera receiving data representing motions of the human demonstrator performing the action, for a robot to emulate the observed action. This approach is however aimed at robot being taught to perform the movements in a similar manner like the human demonstrator, without visual servoing (i.e., vision-based control) during the execution of the task by the robot.

Recent research also tried to combine PbD with visual servoing. In some methods, a human demonstrator guides manually the robot links so that an eye-in-hand camera (i.e., a camera mounted on robot's end-point) records visual parameters of the task along with joint measurements corresponding to the task. These measurements may be used to obtain a generalized robot arm trajectory from several task demonstrations. Visual servoing from the eye-in-hand camera along with joint servoing is then used to follow the obtained generalized trajectory. Alternatively, a camera may be attached on a human demonstrator's limb with different joint angle or position sensors to teach the movement to be generalized, which may require scaling of the human's links trajectories to the robot's joints controls. Such methods could be categorized (in either cases) as kinesthetic demonstrations, and they are designed to teach robot trajectories from the standpoint of the robot's structure, as opposed to teaching manipulated objects trajectories.

SUMMARY OF THE INVENTION

Embodiments of this invention provide, without limitations, a method for programming at least one robot by demonstration, comprising performing at least one demonstration of at least one task, preferably of at least one manipulated object, in the field of view of at least one fixed camera to obtain a set of observed task trajectories, optionally a feature task trajectory; generating a generalized task trajectory from the set of observed task trajectories; and execution of at least one task by the robot in the field of view of at least one fixed cameras, preferably using image-based visual servoing to minimize the difference between the robot-followed trajectory during the task execution and the generalized task trajectory.

Embodiments also include a system able to execute a task learned by observation of a demonstration of at least one task, comprising: at least one robot with at least one movable end-effector; at least one fixed camera for observing at least one demonstration of at least one task and observing the execution of said at least one task by the robot; at least one processing unit for generating a generalized task trajectory from the set of observed task trajectories; at least one controller for servoing the robot to reproduce the task with its end-effector in the field of view of said at least one fixed camera, preferably using image-based visual servoing (herein also designated "IBVS") to minimize the difference between the observed trajectory during the execution and the generalized task trajectory. In some embodiments, the at least one controller and at least one processing unit may be combined in a single unit. For example, a single computer may be used to both generalize the at least one task and for servoing of the at least one robot. In some embodiments, the at least one robot, the at least one camera, the at least one processing unit and the at least one controller may be integrated into a single unit.

In various embodiments, the set of observed task trajectories comprises the data from at least one demonstration of the at least one task in the field of view of the at least one fixed camera. In various embodiments, projections of a set of salient features of a manipulated object onto the image space of the at least one camera are concatenated to constitute the observed task trajectory.

Observation of the task demonstration may include estimating, from acquired images, the Cartesian velocities of said at least one manipulated object in addition to the Cartesian positions of the at least one manipulated object.

Image-based visual servoing during the execution comprises measuring and controlling the projections of the object features onto the image space of the camera.

In some embodiments, the generation of a generalized task trajectory includes the step of performing a smoothing of the set of observed task trajectories.

In some embodiments, obtaining a generalized task trajectory further comprises a step of performing an optimization process. The optimization process may be a constrained optimization problem, where the objective is to find an optimal reproduction strategy with respect to a given cost function, subject to constraints imposed on the observed object trajectory, such as, but without limitations, limitations of the dexterous workspace of the robot (sometimes also referred to as the robot's maximal reach) and limitations to the maximum velocity of the robot end-effector, either due to intrinsic robot limitations or limitations from the application for which the robot is programmed. In some embodiments, the cost function is formulated as a second order conic optimization (herein also designated "SOCO").

In some embodiments, the steps of smoothing the set of observed task trajectories and the step of performing an optimization process are done successively.

Preferred embodiments of the invention include a method of programming at least one robot by demonstration comprising: performing at least one demonstration of at least one task in the field of view of at least one fixed camera to obtain at least one observed task trajectory of at least one manipulated object, preferably at least one set of observed task trajectories; generating a generalized task trajectory from said at least one observed task trajectory, preferably from said at least one set of observed task trajectories; and executing said at least one task by said at least one robot in the field of view of said at least one fixed camera, preferably using image-based visual servoing to minimize the difference between the executed trajectory during said execution and the generalized task trajectory.

Preferred embodiments also include a system for executing at least one task learned by at least one observation of at least one demonstration, comprising: at least one robot with at least one movable end-effector; at least one fixed camera for observing said at least one demonstration of the at least one task, resulting in at least one observed task trajectory, preferably at least one set of observed task trajectories, and observing the execution of said at least one task by said at least one robot; at least one processing unit for generating a generalized task trajectory from said set of observed task trajectories; at least one controller for servoing said at least one robot to reproduce the task with its end-effector in the field of view of said at least one said fixed camera using image-based visual servoing to minimize the difference between the observed trajectory during the execution and the generalized task trajectory.

Various preferred embodiments also include any embodiment described herein, whereas: Cartesian positions and velocities of said at least one manipulated object are calculated from image measurements from said observed task trajectories; and/or said image-based visual servoing comprises minimizing the differences between the Cartesian positions and velocities of at least one feature of said at least one manipulated object and the generalized image feature trajectories; and/or a reference task trajectory is obtained by performing a smoothing of said set of observed task trajectories, and whereas said smoothing may be performed using a smoothing method selected from a group consisting of Kalman smoothing, hidden Markov model filtering, Gaussian mixture regression, dynamical systems smoothing and filtering.

In various preferred embodiments, said generalized task trajectory is obtained by performing a second order conic optimization of the reference task trajectory within a set of constraints imposed on said observed task trajectories and said at least one robot; and said constraints may limit the generalized trajectory to the field of view of said at least one camera; and said constraints may limit the generalized trajectory to the dexterous workspace of said at least one robot; and said constraints may limit the maximum velocity of said at least one robot end-effector.

In various preferred embodiments, said at least one camera further comprises at least one sensor for the perception of depth of pixels for each image acquired from said at least one camera; and said depth of said pixels may provide depth information on said observed task trajectories and during said image-based visual servoing; and/or said at least one robot further comprises at least one tactile force sensor for monitoring tactile force during said execution of said task by said at least one robot, such as with the implementation of a force feedback control method based on information from said at least one tactile force sensor.

Embodiments further comprise the above described systems, whereas: said controller and said processing unit are combined in a single computer; and/or said image-based visual servoing is programmed so as to minimize the differences between the manipulated object features and the generalized task features trajectories; and/or said at least one robot, cameras, processing unit and controller are integrated into a single device; and/or at least one said camera includes at least one sensor for perception of the depth of pixels for each image acquired from said at least one camera, for said depth information to be used by said processing unit for generating the generalized task trajectory and said at least one controller for servoing said at least one robot to reproduce said at least one task.

BRIEF DESCRIPTION OF THE FIGURES

For a fuller understanding of the nature, object and advantages of the invention, reference should be made to the following drawings and detailed descriptions thereof.

Figure 1:
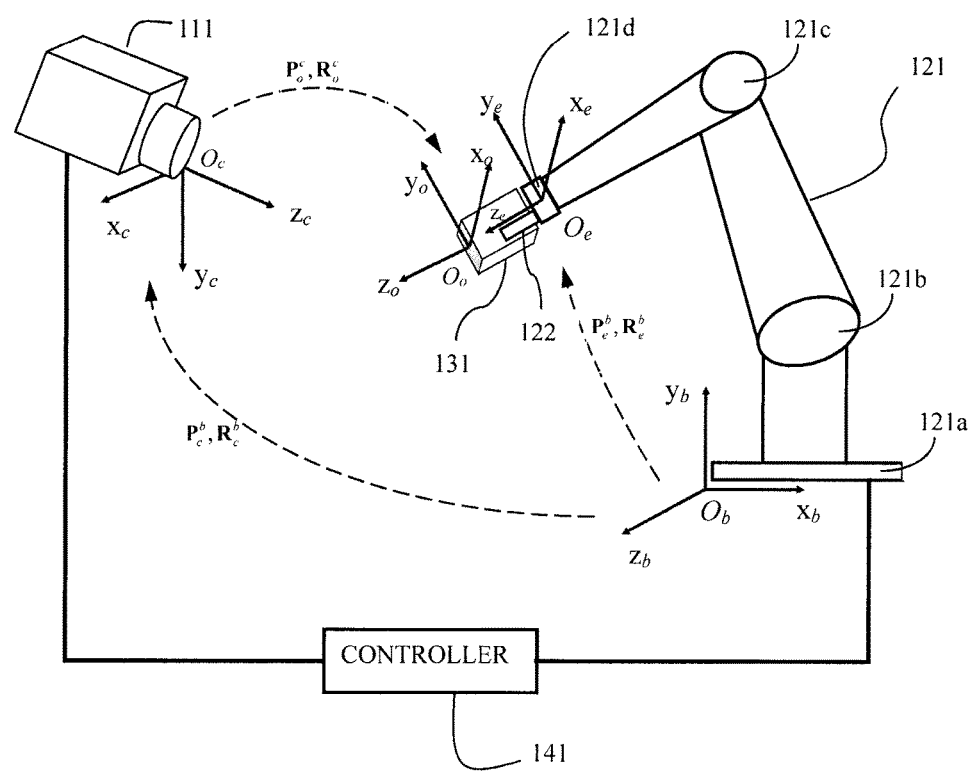
FIG. 1 is a schematic depiction of a robot learning system, comprising a fixed remote camera, a manipulated object and an arm-type robot, showing the Cartesian frame of reference of the camera, the frame of reference of the manipulated object, the robot end-point frame and the robot base frame.

It should be noted that the invention is shown in a schematic form and from the perspective of some examples for illustrative purposes only.

DETAILED DESCRIPTION OF THE PREFERRED EMBODIMENTS

To achieve a robust positioning under uncertainties during the task execution, a first preferred embodiment employs a vision-based control strategy (i.e., visual servoing) during the execution of the task. One object of this embodiment is to formulate and analyze synergistic integration of visual servo controller into the PbD framework.

The method described herein employs a set of demonstrations captured as trajectories of relevant scene features projected onto the image plane of a stationary camera. The Kalman smoothing algorithm is used to extract a reference task trajectory for each image feature. This set represents smooth and continuous averages of the observed feature trajectories, to be used as reference trajectories in generating a plan for task reproduction. Similarly, a Kalman smoother is employed for recovering reference velocities of the tracked object from the demonstrations. The planning step is formulated as an optimization problem, with a cost function which minimizes the distance between the current and reference image feature vectors and current and reference object velocities. The constraints in the model include the visual, workspace task and robot constraints (e.g., those related to the visibility of the features, workspace, robot kinematics, etc). All the constraints are formulated in a linear or conic form, thus enabling to solve the model as a convex optimization problem. Subsequently, an IBVS controller is employed to ensure robust execution of the generated feature trajectories in presence of uncertainties, such as image noise and camera modeling errors.

Planning of trajectories for a set of target features directly in the image space of a vision camera is implemented in the context of using a visual servo tracker. The planning step is initialized by the available examples of the image feature trajectories that are acquired from the demonstrations. Since direct planning in the image space can cause sub-optimal trajectories of the robot's end-point in the Cartesian space, a constraint is formulated in the model which forces the respective Cartesian trajectory to stay within the envelope of the demonstrated motions.

It is assumed that a task is demonstrated by a human teacher M times in front of a robot learner. The robot observes the demonstrations via a stationary vision camera. Through processing the sequences of recorded images from the demonstrations, the task is described by image-space trajectories of several salient features from the environment. The object of interest in the scene depends on the task, and it can be a tool, a workpiece, an end product, the demonstrator's hand, etc. Among the different types of features that can be extracted from the images, the system can utilize coordinates of points in the image plane of the camera (e.g., corners, area centroids, etc).

The observed pixel coordinates of the feature point n at time instant $t_k$ for the demonstration m are denoted by $u_n^{(m)}(t_k)=[u_n^{(m)}(t_k) v_n^{(m)}(t_k)]^T \in R^2$, for n=1, 2, ..., N, and m=1, 2, ..., M, where N denotes the total number of used feature points, and M pertains to the total number of recorded demonstrations. For this embodiment, it is assumed that the pixel coordinates of the features points can be transformed into spatial image plane coordinates:

$$\begin{cases} x_n^{(m)}(t_k) = (u_n^{(m)}(t_k) - u_0)/fk_u \\ y_n^{(m)}(t_k) = (v_n^{(m)}(t_k) - v_0)/fk_v \end{cases} \quad (1)$$

where $u_0$ and $v_0$ are the coordinates of the principal point, f denotes the focal length of the camera, and $k_u$ and $k_v$ are the horizontal and vertical number of pixels per unit length of the vision sensor. The pairs of image plane coordinates for the feature point n at time $t_k$ are denoted by $p_n^{(m)}(t_k) = [x_n^{(m)}(t_k) y_n^{(m)}(t_k)]^T \in R^2$. The set of all observed features for the demonstration m forms the image features parameters vector, with the following notation used:

$$s^{(m)}(t_k))=[p_1^{(m)}(t_k)^T p_2^{(m)}(t_k)^T \ldots p_n^{(m)}(t_k)^T] \in R^{2n}$$

A graphical representation of the environment is shown in FIG. 1, which depicts the robot (121), the camera (111) that is fixed in the workspace, and the object (131) which is manipulated during the task reproduction by the robot. A controller (141), such as a computer, can acquire data from the camera, process the data in accordance with the present invention and perform servoing of the robot movements. In this illustrative example, the controller therefore integrates the processing unit for the generalization of the trajectories. Such controller can also be integrated with the camera or with the robot itself. The robot structure includes an end-effector which is a gripper (122). The robot learning cell therefore consists of an arm-type robot (121), with its end-effector (122), positioned on a fixed base (121a) associated with a robot base frame $F_b(O_b, x_b, y_b, z_b)$, a camera (111) with a frame $F_c(O_c, x_c, y_c, z_c)$, a manipulated object (131) with a frame $F_o(O_o, x_o, y_o, z_o)$, a robot end-effector (121d) with an end-point frame $F_e(O_e, x_e, y_e, z_e)$. The respective positions and orientations transformations ($P_i^j$, $R_i^j$) between the coordinate frames i and j are shown in the figure. Note that the set of Euler roll-pitch-yaw angles $\phi_i^j$ are also used for representation of the orientation whenever required for the discussion on this embodiment.

Based on the set of M observed image feature trajectories from the demonstrations (i.e., $s^{(m)}(t_k)$ for m=1, 2, ..., M and k=1, 2, ...), the goal is to retrieve a generalized trajectory of the image features $s(t_k)$ for k=1, 2, ..., $T_{gen}$, which will allow the robot learner to reproduce the demonstrated task. The notation $T_{gen}$ is used for the time duration of the generalized trajectory for task reproduction.

There are several challenges in generating a task reproduction trajectory directly in the image space. Namely, small displacements of the feature parameters in the image can result in high velocities of the feature points in the Cartesian space. Thus, in some circumstances, mapping of the image features trajectories into the Cartesian space can lead to sub-optimal Cartesian trajectories, which might violate the workspace limits or cause collisions with the objects in the environment. To avoid such scenarios, the generation of a task reproduction trajectory is solved here as a constrained optimization problem. The objective function is formulated for simultaneous optimization of the image features trajectories and the velocity of the object of interest with regards to distance functions. Therefore, the PbD problem is formulated as a constrained optimization problem, where the objective is to find an optimal reproduction strategy with respect to a given cost function, subject to constraints imposed by not only the task but also the selected controller.

For the purpose of this first preferred embodiment, first reference image trajectories are generated. Based on the set of demonstrated trajectories for each feature point n (i.e., $\{p_n^{(1)}, p_n^{(2)}, \ldots, p_n^{(M)}\}$), a Kalman smoother is used to obtain a smooth and continuous reference trajectory $p_n^{ref}$.

Kalman filters are well known in the prior art and operate under the assumption that the underlying system is a linear dynamical system and that all error terms and measurements have a Gaussian distribution (such as a multivariate Gaussian distribution). For Kalman filtering, series of measurements observed over time, each containing random noise and other inaccuracies, produce estimates of unknown variables that tend to be more precise than those based on a single measurement alone. The Kalman smoothing used in this embodiment consists of two passes through the observations, where the forward pass applies the regular Kalman filter algorithm and the backward pass performs the smoothing recursively based on the outcomes of the Kalman filter. Kalman smoothing requires initialization of the parameters, however, it is computationally fast, and can work for trajectories with different shapes complexity.

The observed state of each Kalman smoother is formed by concatenation of the measurements from all demonstrations, that is $o_k = [p_n^{(1)}(t_k)^T \; p_n^{(2)}(t_k)^T \; \ldots \; p_n^{(M)}(t_k)^T]^T \in R^{2M}$. The combined reference trajectories of the feature points form the reference feature parameter vector $s^{ref}(t_k)$, for $k=1, 2, \ldots, T_{gen}$. Subsequently, the first part of the objective function at the time instant $t_k$ is formulated to minimize the sum of distances between the image features parameters and the reference image features parameters at the next time instant, i.e., $\|p_n(t_{k+1}) - p_n^{ref}(t_{k+1})\|$ (the notation $\|\cdot\|$ denotes Euclidean norm of a vector). The goal is to generate continuous feature trajectories in the image space, i.e., to prevent sudden changes in the trajectories.

To define the optimization over a conic set of variables, a set of auxiliary variables is introduced as $\tau_n \leq \|p_n(t_{k+1}) - p_n^{ref}(t_{k+1})\|$ for each feature point $n=1, 2, \ldots, N$.

The second part of the objective function pertains to the velocity of the target object. The goal is to ensure that the image trajectories are mapped to smooth and continuous velocities of the manipulated object. To retrieve the velocity of the object from camera acquired images, first the pose of the object at each time instant is extracted. For this embodiment, a geometric model can provide knowledge about the 3D distances between the object's feature points. The homography transformation between the features locations in an image and their corresponding 3D coordinates is utilized for pose extraction of the object with respect to the camera. For estimation of the homography matrix, the correspondences of at least 4 coplanar points or 8 non-coplanar points in the acquired images are used. The pose of the object relative to the camera frame for the demonstration m is denoted by $\{P_o^{c(m)}, \phi_o^{c(m)}\}$, where $P_o^c$ refers to the translational coordinates, and $\phi_o^c$ denotes the Euler roll-pitch-yaw angles representation of the object's orientation in the camera frame. By differentiating the pose, the linear and angular velocity of the object in the camera frame ($v_o^{c(m)}(t_k) \in R^3, \omega_o^{c(m)}(t_k) \in R^3$) at each time instant are obtained. Similarly to the first part of the objective function, Kalman smoothers are employed to generate smooth averages of the linear and angular velocities of the object, i.e., $v_o^{c,ref} = (v_o^{c,ref}, \omega_o^{c,ref})$. The optimization objective is formulated to minimize the sum of Euclidean distances between an unknown vector related to the current linear and angular velocities and the reference linear and angular velocities.

By analogy to the first part of the objective function, two auxiliary conic variables are introduced: $\tau_v \leq \|v_o^c(t_k) - v_o^{c,ref}(t_k)\|$ and $\tau_\omega \leq \|\omega_o^c(t_k) - \omega_o^{c,ref}(t_k)\|$, respectively.

The objective function is then defined as a weighted minimization of the sum of variables $\tau_1, \ldots, \tau_N, \tau_v, \tau_\omega$), so that:

$$\text{minimize}\left\{\sum_{n=1}^{N} \alpha_n \tau_n + \alpha_v \tau_v + \alpha_\omega \tau_\omega\right\} \quad (2)$$

where the $\alpha$'s coefficients are the weights of relative importance of the individual components in the cost function.

In summary, the optimization procedure is performed to ensure that the model variables are constrained such that at each time instant there exists a meaningful mapping between the feature parameters in the image space and the object's pose in the Cartesian space.

Thus starting from a set of reference feature parameters $$s^{ref}(t_{k+1}) = \{p_n^{ref}(t_{k+1})\}_{n=1}^N$$

and reference velocity $v_o^{c,ref}(t)$, the optimization at each time instant $t_k$ results in a set of image feature parameters $s(t_{k+1})$ that is close to the reference image feature parameters $s^{ref}(t_{k+1})$, and that entails feasible and smooth Cartesian object velocity $v_o^c(t_k)$). From the robot control perspective, the goal is to find an optimal velocity of the end-point (and subsequently, the velocity of the object that is grasped by robot's gripper) $v_o^c(t_k)$, which when applied at the current time will result in an optimal location of the image features at the next time step $s(t_{k+1})$.

The following types of constraints are taken into consideration for this first embodiment: image space constraints, Cartesian space constraints, and robot constraints. Among these constraints, some may include limitation to the robots' dextrous workspace, which will vary as a function of the robot used. For example, a robot possessing less movable joints (i.e., less degrees-of-freedom) may have dextrous limitations preventing movements over some axes, while a robot possessing extensible components may have a longer reach.

The relationship between image features velocities and the velocity of the object in the camera frame is:

$$\dot{s}(t) = L(t)v_o^c(t). \quad (3)$$

Using the Euler forward discretization, (3) can be written as:

$$s(t_{k+1}) = s(t_k) + L(t_k)v_o^c(t_k)\Delta t_k \quad (4)$$

where $\Delta t_k$ denotes the sampling period at time $t_k$, and $L(t_k)$ in the literature is often called image Jacobian matrix, or interaction matrix.

Figure 11:
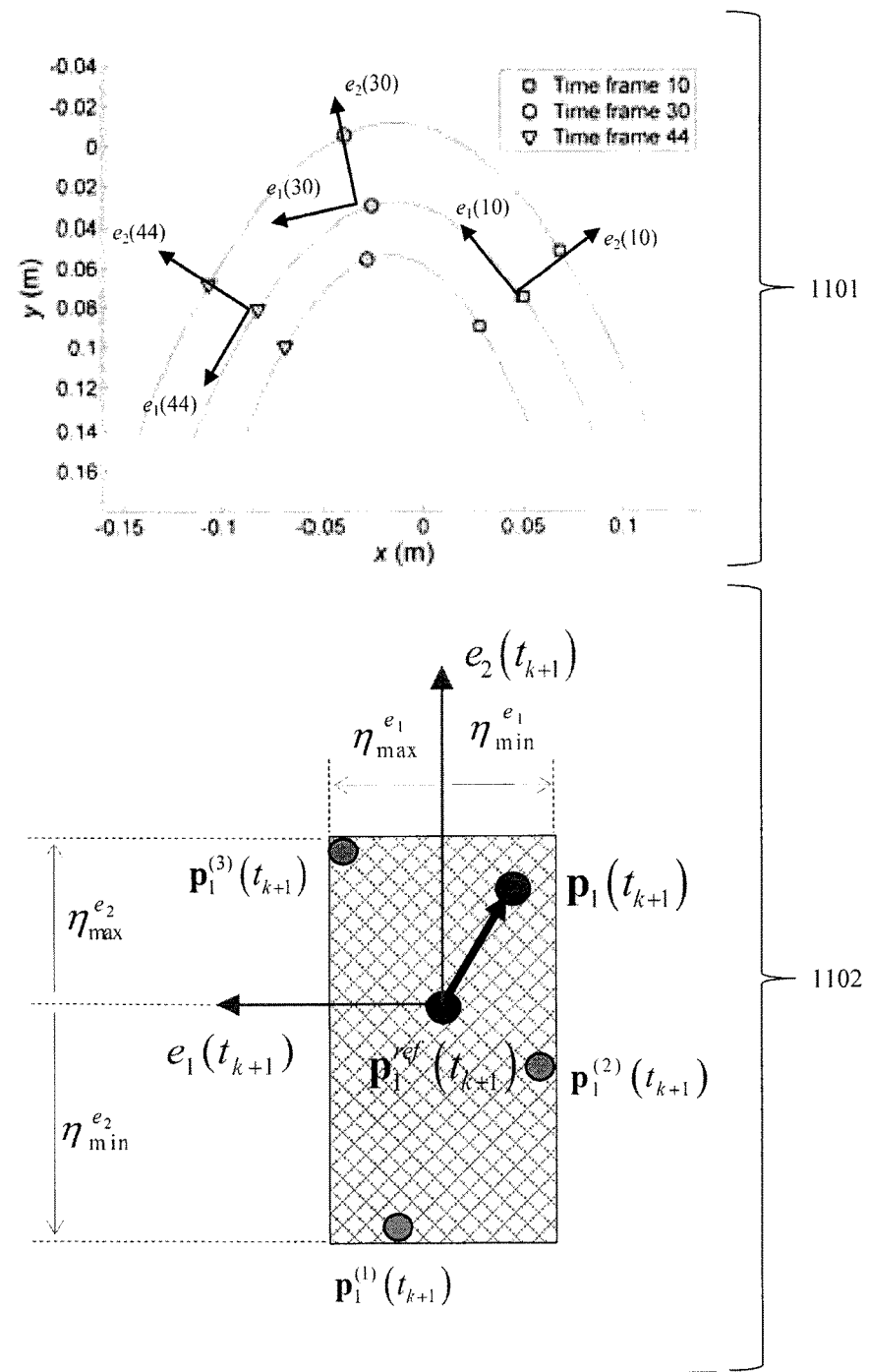
FIG. 11 is an illustration of the eigenvectors of the covariance matrix from three demonstrations at three different times and an illustration of how the parameters of one feature are rotated by the eigenvector matrix.

The second constraint ensures that the features parameters in the next time instant $s(t_{k+1})$ are within the bounds of the demonstrated trajectories. For this purpose, first at each time step we find the principal directions of the demonstrated features, by extracting the eigenvectors of the covariance matrix of the demonstrations. FIG. 11 provides an example of the eigenvectors (1101) of the covariance matrix $e_1(t_k)$ and $e_2(t_k)$ for three demonstrations at times $k=10, 30$ and $44$. The observed image plane features are depicted by different type of marks (square, circles and triangles), each type of mark representing the same feature for the three demonstrations. At time instant $t_k$, the matrix of eigenvectors $E_p(t_k)$ rotates the observation vectors along the principal directions of the demonstrated motions. For instance, the observed parameters for the feature number 1 in the three demonstrations in the next time instant ($p_1^{(1)}(t_{k+1})$, $p_1^{(2)}(t_{k+})$ and $p_1^{(3)}(t_{k+1})$), are shown rotated in FIG. 11 (1102) with respect to the reference image feature parameters.

For feature number 1, the covariance matrix at each time instant is associated with concatenated observation vectors from the set of demonstrations, i.e., $cov(p_1^{(1)}(t_k), p_1^{(2)}(t_k), p_1^{(3)}(t_k))$ The rotated vectors $p_1^{(m)}(t_{k+1})-p_1^{ref}(t_{k+1})$ for m=1, 2, 3 define the boundaries of the demonstrated space at time instant $t_{k+1}$, which corresponds to the hatched section in 1102. The inner and outer bounds of the demonstrated envelope are found as:

$$\begin{cases} \eta_{max}(t_{k+1}) = \max_{m=1,2,\ldots,M} (E_p(t_{k+1})(p_1^{(m)}(t_{k+1}) - p_1^{ref}(t_{k+1}))) \\ \eta_{min}(t_{k+1}) = \min_{m=1,2,\ldots,M} (E_p(t_{k+1})(p_1^{(m)}(t_{k+1}) - p_1^{ref}(t_{k+1}))) \end{cases} \quad (5)$$

The maximum and minimum operations in (5) are performed separately for the horizontal and vertical image coordinates, so that the bounds $\eta_{max/min} = [\eta_{max/min}^{e_1} \, \eta_{max/min}^{e_2}]^T$ represent 2×1 vectors. The vector $p_1(t_{k+1})-p_1^{ref}(t_{k+1})$ is to lie in the region bounded by $\eta_{min}(t_{k+1})$ and $\eta_{max}(t_{k+1})$.

In the event there exists an unknown distance vector $p_1(t_{k+1})-p_1^{ref}(t_{k+1})$, and its coordinate transformation when rotated in the instantaneous demonstrated direction, is denoted:

$$\eta(t_{k+1}) = E_p(t_{k+1})(p_1(t_{k+1}) - p_1^{ref}(t_{k+1})), \quad (6)$$

then, the following constraint ensures that this variable is bounded within the demonstrated envelope:

$$\eta_{min}(t_{k+1}) \leq \eta(t_{k+1}) \leq \eta_{max}(t_{k+1}). \quad (7)$$

In (7), inequalities operate element-wise for each dimension of the vectors. The same notation holds in the description of this embodiment when vector inequalities are used.

By introducing excess and slack variables $\eta_e$ and $\eta_s$, respectively, the constraint (7) can be represented with two linear equalities:

$$\begin{cases} \eta(t_{k+1}) + \eta_e(t_{k+1}) = \eta_{max}(t_{k+1}) \\ \eta(t_{k+1}) - \eta_s(t_{k+1}) = \eta_{min}(t_{k+1}) \end{cases} \quad (8)$$

The image features trajectories should also stay in the field-of-view of the camera. Therefore, if the image boundaries are denoted as horizontal image limits $p^{x,max}$ and $p^{x,min}$ and vertical image limits $p^{y,max}$ and $p^{y,min}$, then at each time instant the following set should hold:

$$\begin{cases} p^{x,min} \leq p_n^x(t_k) \leq p^{x,max} \\ p^{y,min} \leq p_n^y(t_k) \leq p^{y,max} \end{cases} \text{ for } n = 1, 2, \ldots, N, \quad (9)$$

or with adding excess and slack variables, the constraints in (9) are rewritten as $$\begin{cases} p_n(t_k) + p_e(t_k) = p_{max} \\ p_n(t_k) - p_s(t_k) = p_{min} \end{cases} \text{ for } n = 1, 2, \ldots, N. \quad (10)$$

This constraint may be redundant for most tasks, since the general assumption is that the demonstrated image trajectories are within the field-of-view of the camera. However, the constraint might be useful if the trajectories are close to the boundaries of the image. For instance, the image limits $p_{min}$ and $p_{max}$ can be set to 5 or 10 pixels from the field-of-view, which can prevent the executable trajectories to get very close to the image boundaries, and it will reduce the chances of losing some features during the visual tracking, due to image noise or other uncertainties.

Regarding the Cartesian constraints, the first constraint relates the Cartesian trajectory position with the velocity of the object expressed in the camera frame:

$$\frac{d}{dt}P_o^c(t) = v_o^c(t) \quad (11)$$

or in a discrete form $$P_o^c(t_{k+1}) = P_o^c(t_k) + v_o^c(t_k)\Delta t_k. \quad (12)$$

The next important constraint is to ensure that the Cartesian trajectory of the object stays within the demonstrated space. This constraint will prevent potential collisions of the object with the surrounding environment, under assumption that the demonstrated space is free of obstacles.

Similarly to the image based constraint in (5-8), the inner and outer bounds of the demonstrations are found from the principal directions of the covariance matrix of the demonstrated Cartesian trajectories:

$$\begin{cases} \mu_{max}(t_{k+1}) = \max_{m=1,2,\ldots,M} (E_p(t_{k+1})(P_o^{c(m)}(t_{k+1}) - P_o^{c,ref}(t_{k+1}))) \\ \mu_{min}(t_{k+1}) = \min_{m=1,2,\ldots,M} (E_p(t_{k+1})(P_o^{c(m)}(t_{k+1}) - P_o^{c,ref}(t_{k+1}))) \end{cases} \quad (13)$$

The value of the rotated distance vector in the next time instant is:

$$\mu(t_{k+1}) = E_p(t_{k+1})(P_o^c(t_{k+1}) - P_o^{c,ref}(t_{k+1})) \quad (14)$$

and it should be bounded by:

$$\mu_{min}(t_{k+1}) \leq \mu(t_{k+1}) \leq \mu_{max}(t_{k+1}) \quad (15)$$

By introducing excess $\mu_e$ and slack $\mu_s$ variables, the constraint can be represented as equalities:

$$\begin{cases} \mu(t_{k+1}) + \mu_e(t_{k+1}) = \mu_{max}(t_{k+1}) \\ \mu(t_{k+1}) - \mu_s(t_{k+1}) = \mu_{min}(t_{k+1}) \end{cases} \quad (16)$$

Another constraint is introduced for the velocity of the object, which is bounded between $v_{min}$ and $v_{max}$ at each time step. These values could correspond to the extreme values of the velocities that can be exerted by the robot's end-point:

$$v_{min} \leq v_o(t_k) \leq v_{max}, \quad (17)$$

or with introducing excess and slack variables it is obtained:

$$\begin{cases} v_o(t_k) + v_e(t_k) = v_{max} \\ v_o(t_k) - v_s(t_k) = v_{min} \end{cases} \quad (18)$$

The first robot manipulator constraint relates the robot joint variables to the object's velocity. It is assumed that when the object is grasped in the robot's gripper (122 in FIG. 1), the velocity transformation between the object frame $v_o^b = (v_o^b, \omega_o^b)$ and robot's end-point frame $v_e^b$ is given by:

$$\begin{cases} v_o^b = v_e^b + \omega_e^b \times P_{e,o}^b = v_e^b - S(R_e^b P_o^e)\omega_e^b \\ \omega_o^b = \omega_e^b \end{cases} \quad (19)$$

The notation S (•) in (19) denotes a skew-symmetric matrix, which for an arbitrary vector $a=[a_x,a_y,a_z]$ is defined as:

$$S(a) = \begin{bmatrix} 0 & -a_z & a_y \\ a_z & 0 & -a_x \\ -a_y & a_x & 0 \end{bmatrix}. \quad (20)$$

The differential kinematic equation of the robot is given by $$v_e^b(t) = J(q(t))\dot{q}(t) \quad (21)$$

where q is a $\xi \times 1$ vector of robot joint variables, and $J(q(t))$ is the robot Jacobian matrix in the end-point frame. Hence, the relationship between the joint variables and the object velocity in the camera frame is obtained using (19) and (21):

$$\begin{aligned} \dot{q}(t) &= J^\dagger(q(t))v_e^b(t) \quad (22) \\ &= J^\dagger(q(t)) \begin{bmatrix} I_{3\times 3} & -S(R_e^b(t)P_o^e) \\ 0_{3\times 3} & I_{3\times 3} \end{bmatrix}^{-1} v_o^b(t) \\ &= J^\dagger(q(t)) \begin{bmatrix} I_{3\times 3} & -S(R_e^b(t)P_o^e) \\ 0_{3\times 3} & I_{3\times 3} \end{bmatrix}^{-1} \begin{bmatrix} R_c^b & 0_{3\times 3} \\ 0_{3\times 3} & R_c^b \end{bmatrix} v_o^c(t) \end{aligned}$$

where $I_{3\times 3}$ and $0_{3\times 3}$ are 3×3 identity and zeroes matrices respectively, and $J^\dagger(q(t)) \in R^{\xi \times 6}$ denotes the pseudo-inverse of the robot Jacobian matrix. At time $t_k$, the equation (22) can be represented in a discrete form:

$$q(t_{k+1}) = \quad (23)$$
$$q(t_k) + J^\dagger(q(t_k)) \begin{bmatrix} I & -S(R_e^b(t)P_o^e) \\ 0_{3\times 3} & I \end{bmatrix}^{-1} \begin{bmatrix} R_c^b & 0_{3\times 3} \\ 0_{3\times 3} & R_c^b \end{bmatrix} v_o^c(t_k)\Delta t_k.$$

The rotation matrix of robot's end-point in base frame $R_e^b(t_k)$ is obtained by using the robot's forward kinematics. The rotation of the camera frame in robot base frame Rb is found from the camera calibration.

A constraint for the robot joint variables (to be within the limits) is defined as:

$$q_{min}^\zeta \leq q^\zeta(t_{k+1}) \leq q_{max}^\zeta \text{ for } \zeta = 1,2,\ldots,\xi, \quad (24)$$

or in the form of equalities, (24) becomes $$\begin{cases} q(t_{k+1}) + q_e(t_{k+1}) = q_{max} \\ q(t_{k+1}) - q_s(t_{k+1}) = q_{min} \end{cases} \quad (25)$$
$$\text{for } \varsigma = 1,2,\ldots,\xi.$$

The formulated problem with the given cost function and all the above constraints is solved as a second-order conic optimization problem [16]. The optimization is defined as:

$$\begin{aligned} \text{minimize} \quad & c^T z \quad (26) \\ \text{subject to} \quad & Az = b \\ & z_c \in K \end{aligned}$$

where the inputs are a matrix $A \in R^{l \times d}$, vectors $c \in R^d$ and $b \in R^l$, and the output is the vector $z \in R^d$. The part of the vector z that corresponds to the conic constraints is denoted $z_c$, whereas the part that corresponds to the linear constraints is denoted $z_l$, that is $z = [z_c^T \; z_l^T]^T$. For a vector variable $z_{c,i} = [z_{c,i}^1 \; z_{c,i}^2 \ldots z_{c,i}^g]$ that belongs to a second-order cone K, one has: $z_{c,i}^1 \leq \|[z_{c,i}^2 \; z_{c,i}^3 \ldots z_{c,i}^g]\|$.

A conic optimization problem exhibits convexity of the solutions space, i.e., global convergence is warranted within the set of feasible solutions. To cast a problem into a second-order optimization requires a mathematical model expressed through linear or conic constraints.

In the considered case the linear equations (4), (6), (8), (10), (12), (14), (16), (18), (23) and (25) are combined to form the equality constraints in (26). The cost function defined in (2) operates over the conic variables:

$$\begin{cases} \tau_n \leq \|p_n(t_{k+1}) - p_n^{ref}(t_{k+1})\| \\ \tau_\nu \leq \|v_o^c(t_k) - v_o^{c,ref}(t_k)\| \\ \tau_\omega \leq \|\omega_o^c(t_k) - \omega_o^{c,ref}(t_k)\| \end{cases} \quad (27)$$
$$\text{for } n = 1, 2, \ldots, N$$

with the objective to minimize simultaneously the norms of the distances between the obtained and reference image features trajectories and object velocities. Therefore, the optimization variable z in (26) at the time instant $t_k$ is formed by concatenation of the variables from the conic constraints given in (27), resulting in:

$$z_c(t_k) = \big[[\tau_\nu, v_o^c(t_k) - v_o^{c,ref}(t_k)], [\tau_\omega, \omega_o^c(t_k) - \omega_o^{c,ref}(t_k)], \big[ \quad (28)$$
$$\tau_1, p_1(t_{k+1}) - p_1^{ref}(t_{k+1})\big], \ldots, \big[\tau_N, p_N(t_{k+1}) - p_N^{ref}(t_{k+1})\big]\big]$$

and the variables from the linear constraints:

$$\begin{aligned} z_l(t_k) = & [P_o^c(t_{k+1}), \eta(t_{k+1}), \mu(t_{k+1}), q(t_{k+1}), v_e(t_k), v_s(t_k), s_e \\ & (t_{k+1}), s_s(t_{k+1}), \eta_e(t_{k+1}), \eta_s(t_{k+1}), \mu_e(t_{k+1}), \mu_s(t_{k+1}), q_e \\ & (t_{k+1}), q_s(t_{k+1})] \end{aligned} \quad (29)$$

i.e., $z(t_k) = [z_c(t_k)^T \; z_l(t_k)^T]^T$. The total dimension of the vector z is $3 \cdot (9+4N+\xi)+5+N$. From the cost function in (2), the part of the vector c in (26) that corresponds to the $z_c(t_k)$ is:

$$c_c(t_k) = [\alpha_\nu, 0_{1\times 3}, \alpha_\omega, 0_{1\times 3}, \alpha_1, 0_{1\times 2} \ldots \alpha_N, 0_{1\times 2}]^T \quad (30)$$

whereas the part $c_l(t_k))$ corresponding to $z_l(t_k))$ is all zeros, since those variables are not used in the cost function (2).

The known parameters for the optimization model at time $t_k$ are: $\Delta t_k$, $s^{ref}(t_{k+1})$, $v_o^{c,ref}(t_k)$, $s(t_k)$, $P_o^c(t_k)$, $L(t_k)$, $E_p(t_{k+1})$, $\eta_{min}(t_{k+1})$, $\eta_{max}(t_{k+1})$, $E_P(t_{k+1})$, $\mu_{min}(t_{k+1})$, $\mu_{max}(t_{k+1})$, $q(t_k)$, $R_e^b(t_k)$, $J^\dagger(t_k)$, and the time independent parameters: $p_{min}$, $p_{max}$, $v_{min}$, $v_{max}$, $q_{min}$, $q_{min}$, $R_c^b$, $P_o^e$.

For the purpose of this demonstrative embodiment, the optimization is solved in MATLAB™ by using the SeDuMi package. Solution of the optimization problem can be achieved through various computing methods, using a variety of programming languages and optimization solution tools, the example being provided for illustrative purposes only.

To follow the image feature trajectories $s(t_{k+1})$ for $k=1, 2, \ldots, T_{gen}$ generated from the optimization model, an image-based visual tracker is employed. This control ensures that the errors between the measured feature parameters $\bar{s}(t)$ and the followed feature parameters $s(t)$, i.e., $e(t) = \bar{s}(t) - s(t)$, are driven to zero for $t \in (0, \infty)$. Selecting a controller for exponential decoupled decrease of the error $\dot{e} = -\lambda e$, and using (3), one obtains:

$$\dot{e}(t) = \dot{\bar{s}} - \dot{s} = L(t) v_o^c(t) - \dot{s}. \tag{31}$$

Hence $$v_o^c(t) = -\lambda \hat{L}^\dagger(t) e(t) + \hat{L}^\dagger(t) \dot{s}(t), \tag{32}$$

where $\hat{L}^\dagger(t)$ denotes an approximation of the pseudo inverse of the image Jacobian matrix $L(t)$. The applied control law warrants that when the error between the measured and the followed feature parameters is small, the velocity of the object will follow closely the desired velocity generated by the optimization model.

Note that the image Jacobian matrix $L(t)$ requires information that is not directly available from the image measurements, e.g., partial pose estimation of the object. Therefore an approximation of the matrix is used, with different models for the approximation reported in the literature.

Asymptotic stability is achieved in the neighborhood of $e=0$ if the matrix $\hat{L}^\dagger L$ is positive definite. Global asymptotic stability cannot be achieved, because $\hat{L}^\dagger$ has a non-zero null space. However, in the neighborhood of the desired pose the control scheme is free of local minima, and the convergence is obtained. These properties of the IBVS control scheme render it suitable for the present embodiment. Under proper calibration, the errors between the current and desired feature parameters will converge to zero along the tracked trajectory.

For calculations of the robot joint angles, the robot Jacobian matrix is combined with the image Jacobian matrix into a feature Jacobian matrix $J_s \in R^{2n \times \xi}$:

$$J_s(q, t) = L(t) \begin{bmatrix} (R_c^b)^T & 0_{3 \times 3} \\ 0_{3 \times 3} & (R_c^b)^T \end{bmatrix} \begin{bmatrix} I_{3 \times 3} & -S(R_e^b(t) P_o^e) \\ 0_{3 \times 3} & I_{3 \times 3} \end{bmatrix} J(q(t)). \tag{33}$$

The joint angles of the robot are updated based on (22) and (32), i.e.:

$$\dot{q}(t) = -\lambda \hat{J}_s^\dagger(q,t) e(t) + \hat{J}_s^\dagger(q,t) \dot{s}(t). \tag{34}$$

Referring back to FIG. 1, a robot having a plurality of degrees of freedom is demonstrated. For example, this example shows a base of the robot (121a), and operation of the joints (121b and 121c), with a movable wrist (121d) each providing one or two degrees of freedom.

Figure 2:
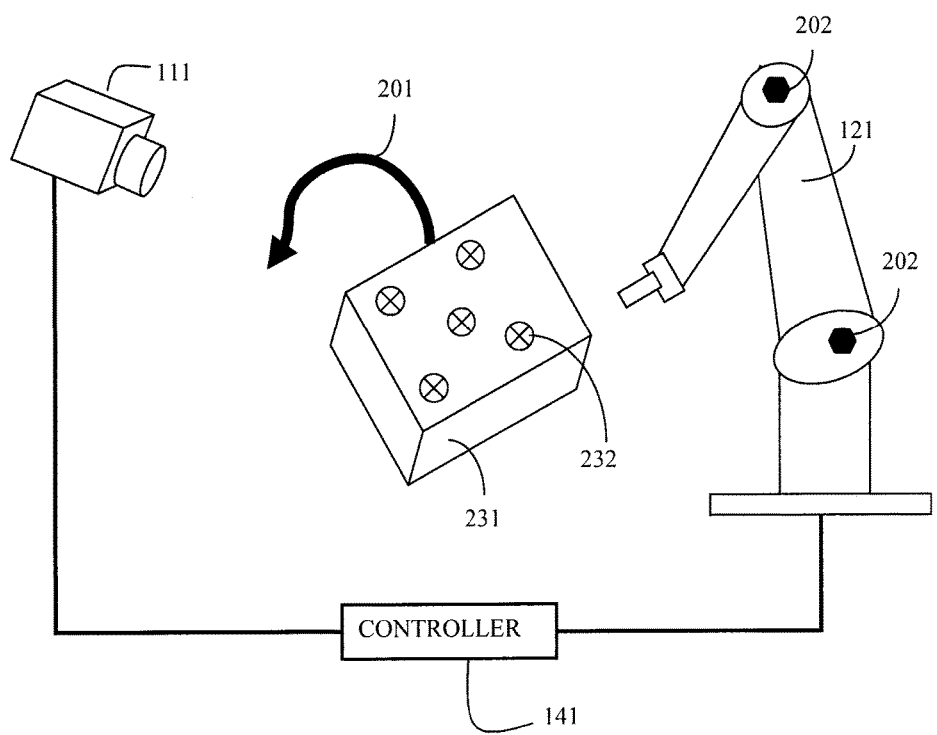
FIG. 2 is a schematic depiction of the demonstration step of one embodiment of the invention, whereas circular features on a manipulated object are observed by the camera for the purpose of learning the task.

FIG. 2 is an illustrative example for one specific task, whereas the camera (111) observes the movements (201) of a manipulated object (231). At this demonstration stage, the robot arm may be used for a partially visual, partially kinesthetic demonstration under PbD, for example with kinesthetic information coming from angle measurement sensors (202) embedded into the robot's joints. The robot arm may also be left out or retracted (121) during the demonstrations, as illustrated in FIG. 2. Pixel coordinates of the centroids of dots (232) are considered as image feature parameters. Tracking of the features in the image sequences is based on a 'dot tracker' method for image processing. Before the manipulation, the five dots are manually selected in an acquired image. Afterwards, tracking of each feature is achieved by processing the regions of interest, centered at the centroids of the dots in the previous image.

The feature extraction involved binarization, thresholding, and centroids calculation of the largest objects with connected pixels. The extracted trajectories $(u_n^{(m)}(t_k)$ for $n=1, \ldots, 5, m=1, \ldots, 5, k=1, \ldots, T_m)$ are initially lightly smoothed with a moving average window of 3-points, and linearly scaled to the length of the longest demonstration.

In alternative embodiments, if the demonstrated trajectories were temporally scaled (for instance, by using the dynamic time warping algorithm), it would cause distortion of the velocity profile of the trajectories.

For FIGS. 4 to 9, an example of a task learned in accordance with the above embodiment is provided. This example is non-limitative and illustrates a simple task. More complex tasks could be processed in a similar manner.

Figure 4:
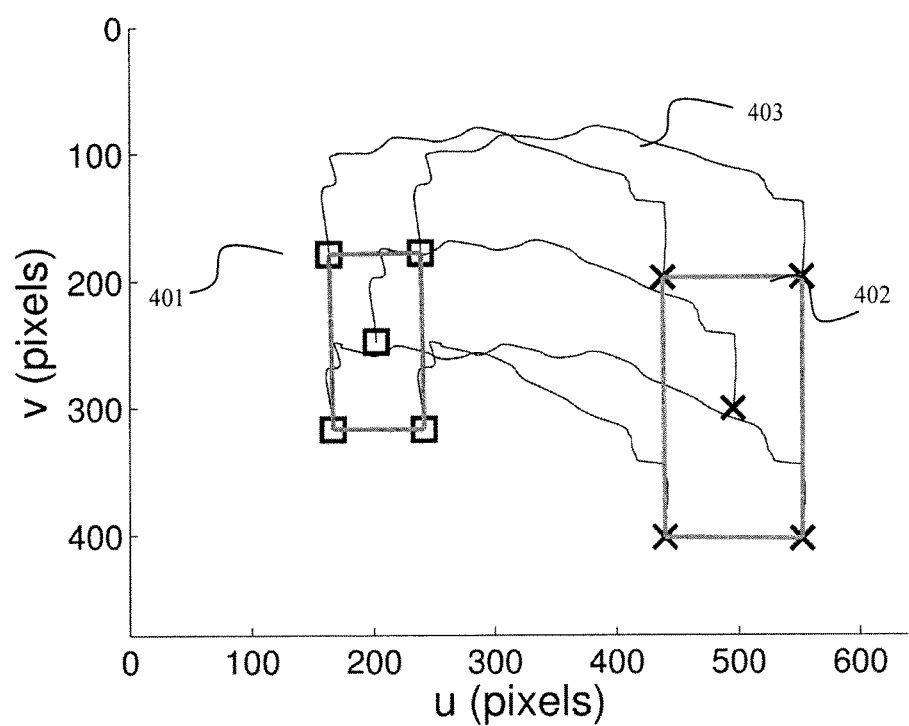
FIG. 4 shows an example of a single demonstrated object trajectory measured by the camera for a set of feature points, in the demonstration of a task involving the manipulation of an object whereas five feature points are tracked on the observed object.

FIG. 4 illustrates acquired feature trajectories in the image plane of the camera for one demonstration of the task example. The initial states of the trajectories are indicated by square marks (401), while the final states are indicated by cross marks (402). Each initial state is connected to a final state through a single trajectory (403). Each trajectory corresponds to the results from tracking the movements for one feature on the manipulated object, such as the centroid features of FIG. 2 (232).

The total number of demonstrated trajectories M may be set to any number of demonstrations. As can be understood by a person skilled in the art, the number of demonstrated trajectories may be any number, including a single demonstrated trajectory. However, in the case of a single demonstrated trajectory, smoothing techniques will only result in removal of some undesired movements in the single observed trajectory, such as removal of the human demonstrator's inherent shaking.

Figure 5:
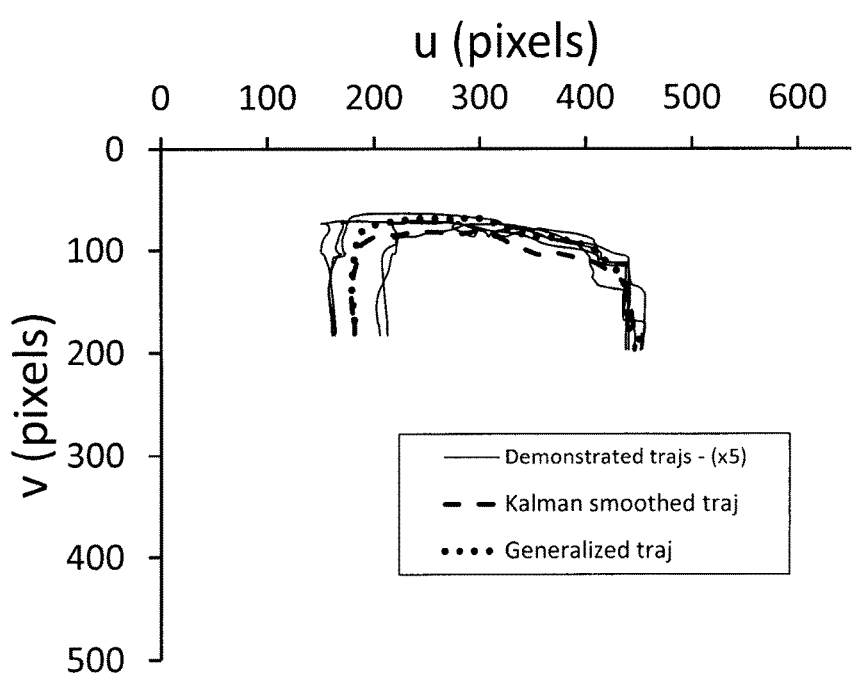
FIG. 5 shows, for the same example as FIG. 4, a set of demonstrated (observed) trajectories for one feature point, smoothed to obtain a reference task trajectory (Kalman smoothed trajectory) and to obtain a generalized trajectory for this feature point, also shown on the graph.

For the same example, FIG. 5 shows the set of demonstrated trajectories for a single feature, the reference trajectory from Kalman smoothing and the corresponding generalized trajectory for this feature point. Kalman smoothers are employed to find a smooth average trajectory of each feature point as well as to find reference velocities of the object $v_o^{ref}$.

Figure 6:
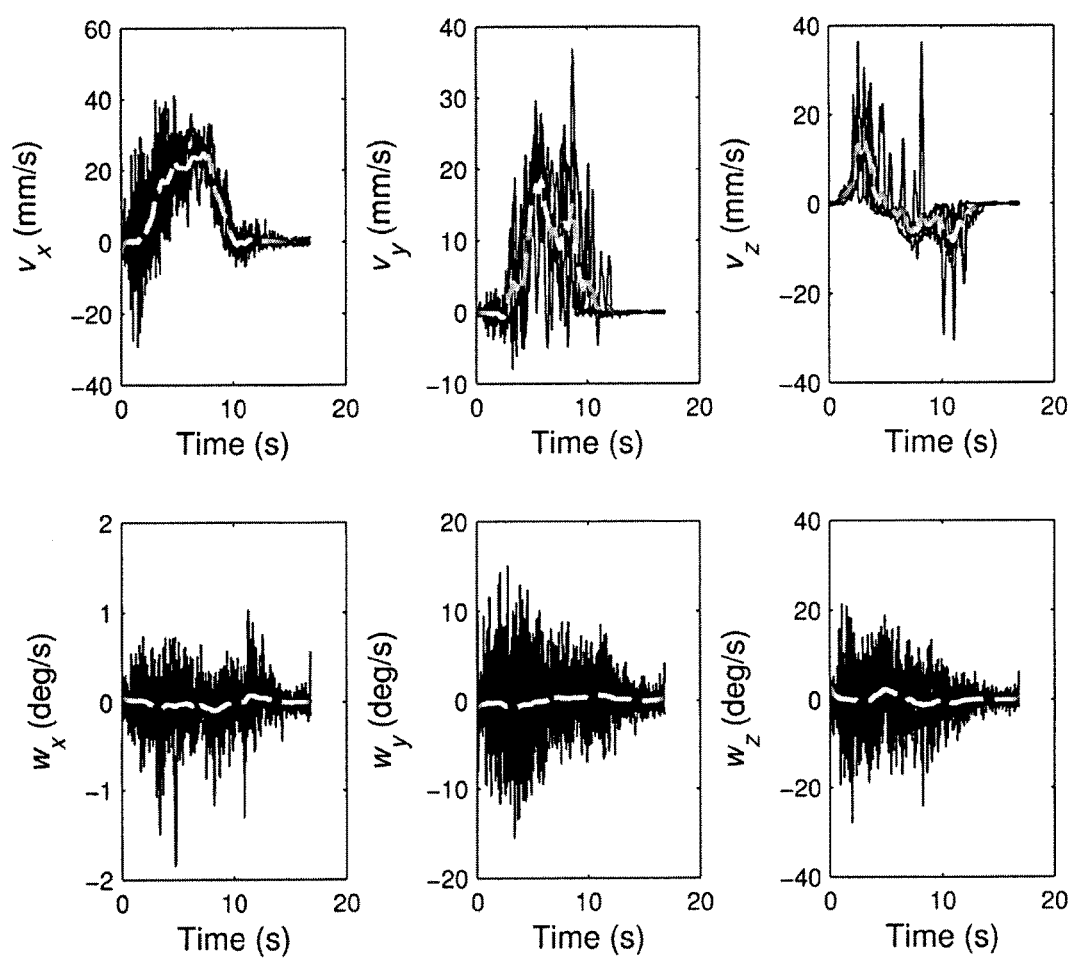
FIG. 6 shows, for the same example as FIG. 4, demonstrated linear and angular velocities of the object and the reference velocities after smoothing. In both cases, three axes for linear velocities and three axes for angular velocities are measured.

Again for the same example, FIG. 6 illustrates noisy observed Cartesian linear velocities $v_{x,y,z}$ and rotational velocities $\omega_{x,y,z}$. These observations are smoothed out by the Kalman smoothing procedure. Observed velocities are illustrated as black full lines, and the reference velocities from Kalman smoothing are illustrated as clear dashed lines.

Figure 7:
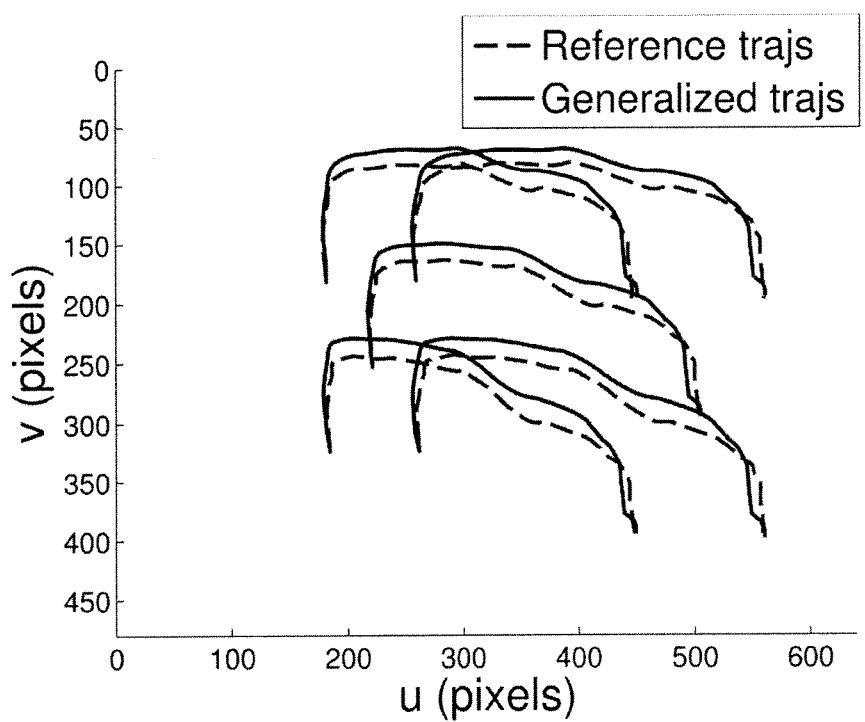
FIG. 7 shows, for the same example as FIG. 4, the comparison between the Kalman smoothed trajectories for a set of features and the resulting generalized trajectories after optimization.

FIG. 7 shows both the Kalman smoothed reference image features trajectories and the second order conic optimization (SOCO) resulting image features trajectories, for a set of five features corresponding to the set of features from FIG. 4, which are the generalized trajectories taking into consideration all constraints of the system that were inputted in the SOCO model. For the SOCO model, different weighting coefficients can be placed on the different parameters, as desired by the demonstrator or for specific robot applications. We recommend setting the weighting coefficients to provide higher weight on following the reference velocities, while the model constraints would ensure that the generated feature trajectories in the image space are close to the reference trajectories and are within the bounds of the demonstrated space.

The set of generalized features trajectories of the manipulated object, when taken collectively (such as through concatenation), form the global generalized trajectory of the task for the manipulated object.

Figure 8:
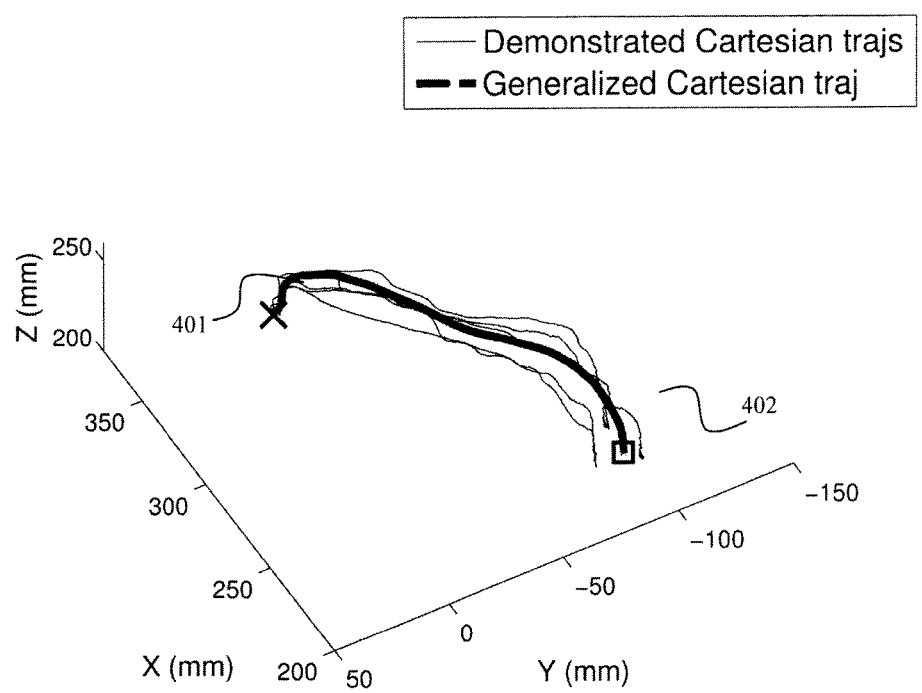
FIG. 8 shows, for the same example as FIG. 4, the comparison between the demonstrated trajectory for one feature and the resulting generalized trajectory after second order conic optimization.

FIG. 8 shows, for this example, the comparison between the demonstrated Cartesian trajectories of the object and the resulting generalized trajectory. It can be noticed that the generated trajectory from the SOCO optimization is constrained to lie within the envelope of the demonstrated trajectories.

Figure 3:
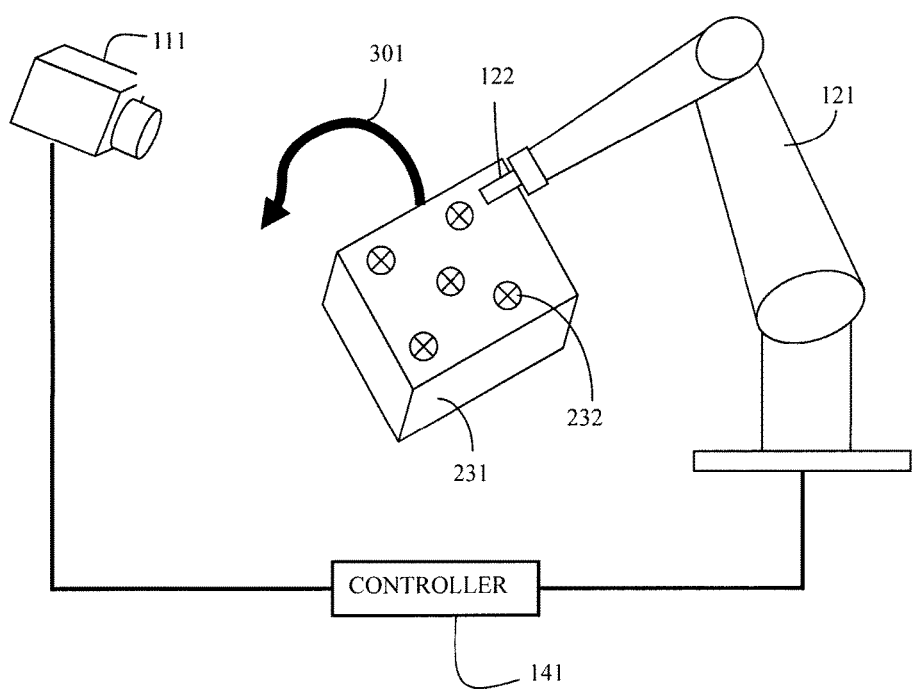
FIG. 3 is a schematic depiction of the same embodiment of the invention whereas circular features on a manipulated object are observed by the camera for the purpose of the execution of the task by the robot.
Figure 9:
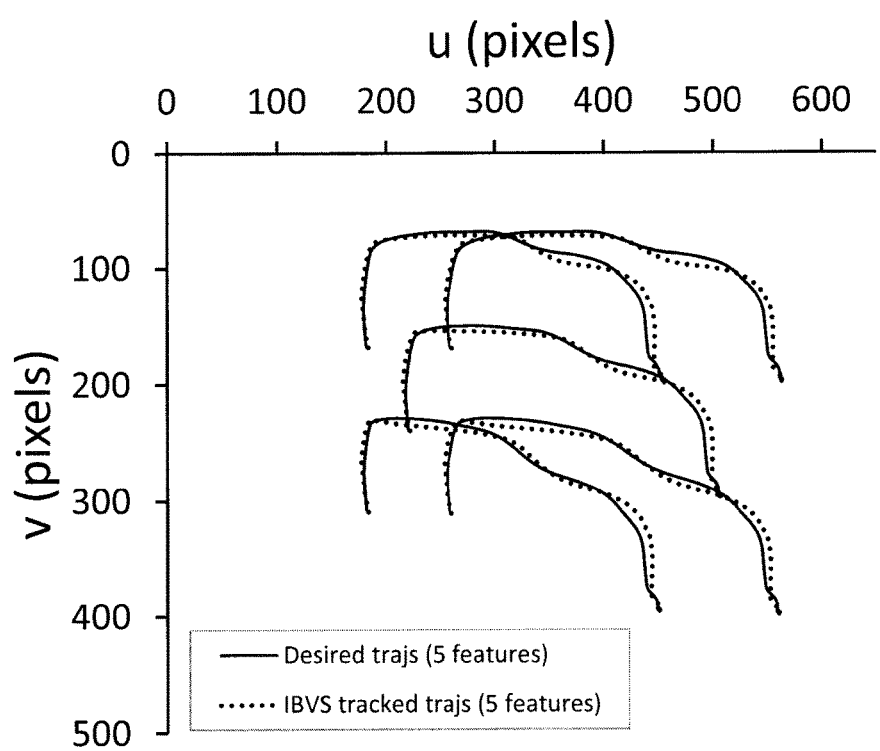
FIG. 9 compares, for the same example as FIG. 4, the resulting generalized features trajectories after optimization and the IBVS tracked features trajectories during task execution by the robot.

FIG. 3 provides an illustrative example of the task reproduction (execution) of the robot after obtaining the generalized trajectory. The robot arm (121) is holding the manipulated object (231) in the field of view of the camera (111). The objective is to obtain a movement by the robot (301) which corresponds to the generalized trajectory of the demonstration. To move the object by the robot along the generalized trajectory from the optimization model, the IBVS tracking control form is employed. Trajectories of the object features are tracked during the task execution by the robot using the same features (232) as during the demonstration step of FIG. 2. FIG. 9 shows, for the same example, the resulting generalized trajectories after optimization and the IBVS tracked trajectories during the task execution by the robot, for a set of image features corresponding to the features from FIG. 4.

As can be understood by a person skilled in the art, in the selection of the control gain $\lambda$ in (34), higher gains dictate fast adaptation to the desired trajectory accompanied with reduced accuracy due to overshoots, and vice versa for the lower control gains. Thus, in this example of preferred embodiment, the parameter $\lambda$ was set to 0.75 for the first $4/5^{th}$ of the trajectory length to ensure accurate tracking, and to 0.1 for the last $1/5^{th}$ of the trajectory to provide accurate positioning at the end of the task.

The above embodiment illustrates a non-limitative framework for utilizing the robustness of vision-based control in PbD learning. If the constraints imposed on the system are too strict, it may be possible that the intersection between the conic space and the affine space in the model (26) is an empty set. Therefore, a solution needs to be within the limits of the robot joints' range limits and the general reach of the robot, therefore satisfying the model constraints. In some alternative preferred embodiments, partly kinesthetic demonstrations are used to avoid the empty set of solutions scenario, since such demonstrations will ensure that the robot configurations in the demonstrated trajectories are within the dexterous workspace of the robot, and therefore all positions of the generalized trajectory will be within reach of the robot. An example of this would be tracking of the object features by visual observation while the object is manipulated while being grasped in the gripper of the robot. The robot's joints are left loose, simply to follow the movements which are imposed on the object by the demonstrator. In any case, the model parameters may be designed to provide a basis for existence of solutions to the optimization models.

It is also possible with the method described hereinabove to perform tasks involving trajectories with intersecting parts, such as loops.

The above methods may also be applied to robot learning tasks involving known or unknown object shapes. In the case of objects which are observed solely by a single 2D camera, known object geometry allows extracting the Cartesian object trajectory from the observed images through a homography transformation. It is therefore required to obtain the information for the object model prior to the demonstration step of PbD, whether imputed by an operator prior to the demonstration step, acquired by sensors or otherwise. For example, series of features are identified on the object prior to the demonstration step, such as crosses, centroids, edges . . . . In alternative preferred embodiments whereas the object is observed with the use of sensors that provide additional depth information per pixel (detailed below), such homography transformation can be unnecessary, since the depth information of the features points is measured by the depth sensor. Therefore, in such alternative embodiments where a depth sensor is used, it would be possible to acquire the trajectory of an object of unknown shape.

The image features identification could be done through several algorithms, such as the SIFT, SURF or FAST algorithms for extraction of features of the object, as well as any other extraction method allowing identification of features.

Figure 12:
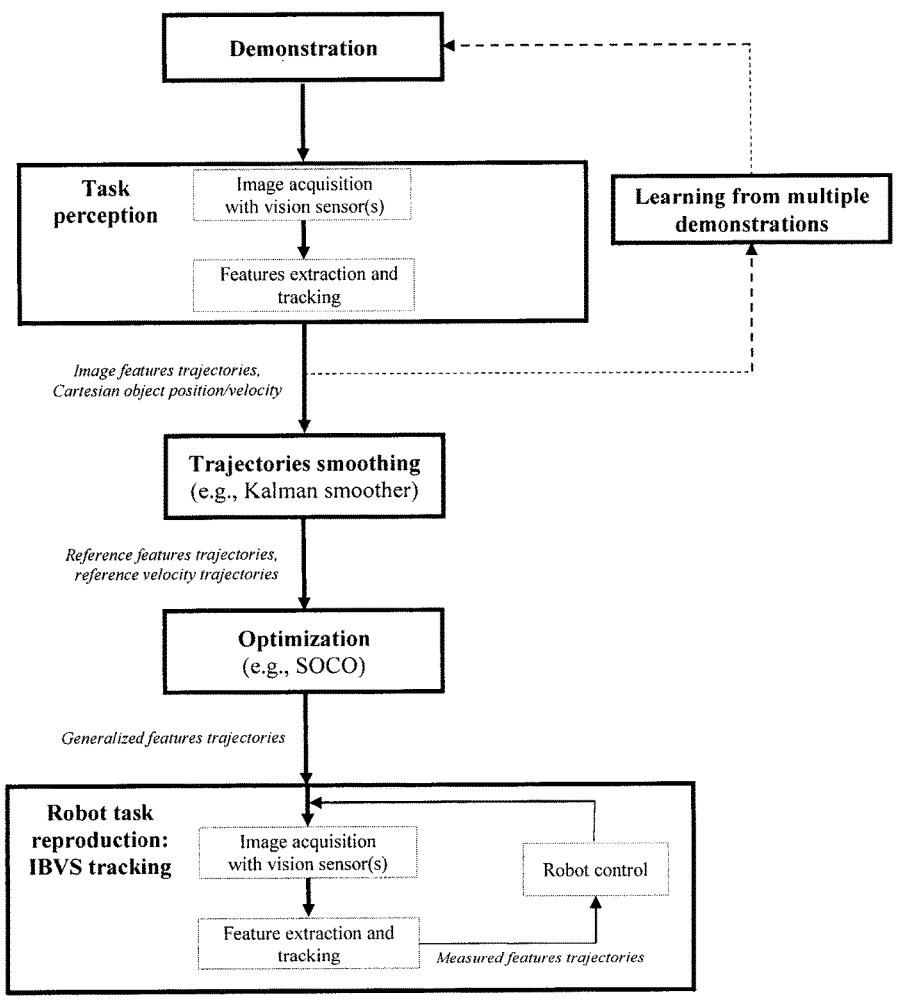
FIG. 12 is a block diagram representation of the image-based robot learning procedure, which consists of the following steps: task demonstration, perception, smoothing, optimization, and task reproduction, with an optional step for learning from multiple task demonstrations.

The main steps of the image-based trajectory learning process are presented using the block diagram description in FIG. 12. The information flow is also depicted in the figure. For instance, the output information from the step of task perception is the image feature trajectories and the manipulated object position and velocity. The learning process can be performed from a single task demonstration, or from multiple task demonstrations. It is preferred to employ several task demonstrations, and with that to provide richer information regarding the task in terms of desired feature trajectories and object velocities.

In a second preferred embodiment, reproduction of learned tasks by using visual servoing is implemented by first performing the task planning in the Cartesian space, then projecting several salient features of the target object onto the image space of a vision camera, and employing image-based tracker for following the image features trajectories. This scenario assumes independent planning and execution steps, since the constraints from the image-based execution are not included in the planning step. The solution ensures robust execution under uncertainties.

Figure 10:
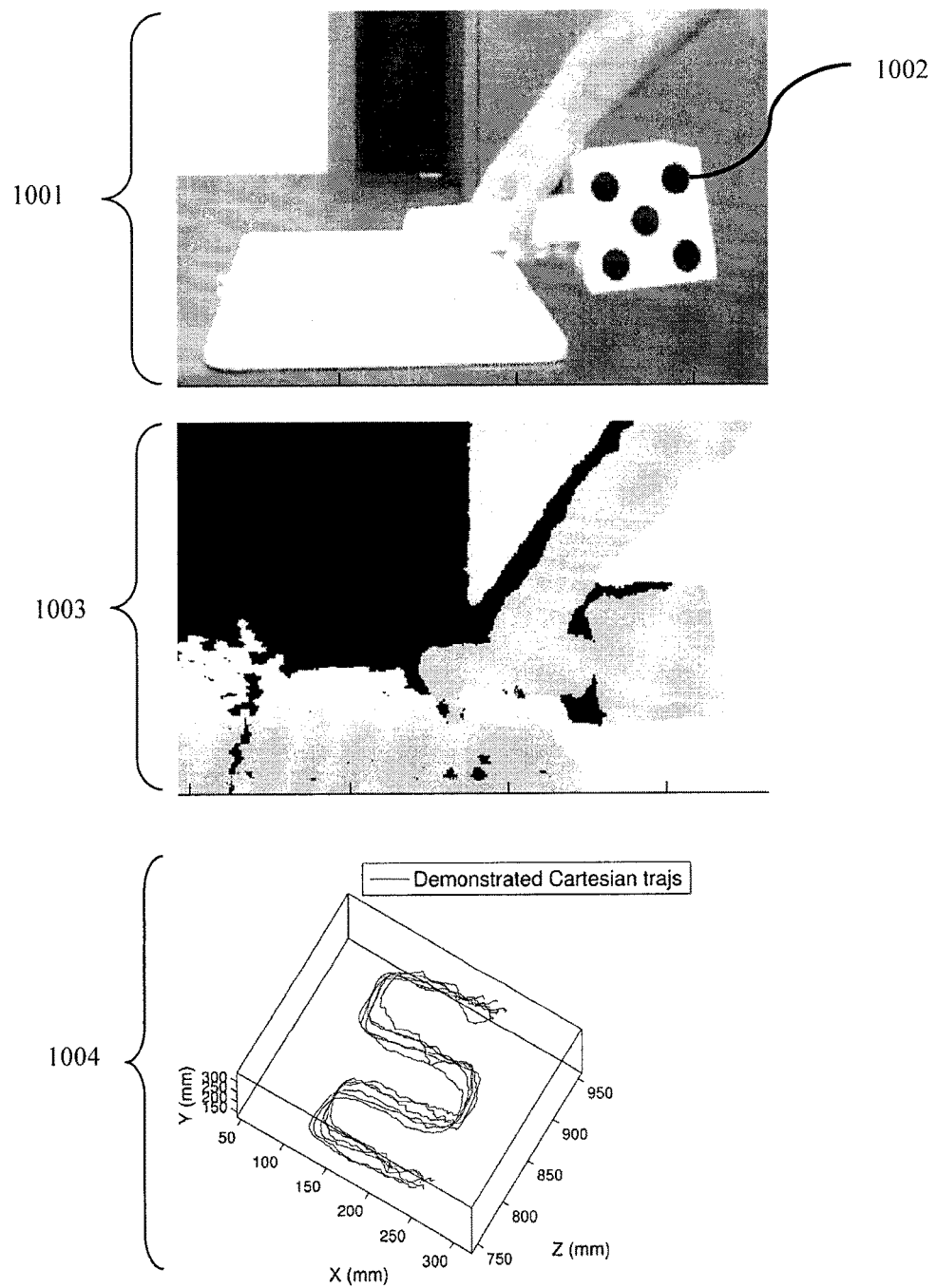
FIG. 10 is an example of feature trajectory acquisition with depth information from a depth sensor. For one given time instant, images from the 2D camera and from the depth sensor are provided, whereas the depth is represented as greyscale. The corresponding measured Cartesian object trajectories are also shown as a separate graph.

In a third preferred embodiment, the camera may be combined with a sensor providing depth information on the acquired image. Such sensors may use, as a non-limitative example, infrared laser to measure the depth for the different scene objects observed by a camera. Kinect™ sensors are examples of such known sensors that can add information to a bi-dimensional view field from a camera, by providing depth information for each pixel in a scene observed by the camera. Such depth information can, for most of the tasks, increase the reliability of measurements for three dimensional movements. FIG. 10 illustrates the acquisition of such depth information during the demonstration process performed by a human demonstrator, whereas the image observed at any given time by a fixed camera (1001), comprises at least one feature for which the trajectory is tracked (1002). At the same time, a depth sensor provides information on the depth of each pixel from the camera image (1003), whereas the depth is illustrated (in 1003) as a grayscale mapping of the image. Therefore, this depth information (1003) is obtained for the location of the tracked features at any given frame time. In this example, the task was demonstrated a total of six times. The resulting object trajectories (1004) therefore combine information from tracking the features on the camera-sourced images (1001) and the depth of the features (1003), and exhibits a combination of both lateral and depth movements. For this example, a Kinect™ sensor was used for camera views and depth measurements. Such depth measurements of the features can be used both during the demonstrations of the task trajectories and during the reproduction (execution) of the task by the robot learner.

In the methods described for the embodiments hereinabove, PbD is based on the assumptions of: (i) perception of the demonstrations is performed with vision cameras; and (ii) execution of the learned strategies is conducted using visual feedback from the scene. While most of the PbD works employ electromagnetic, optical, or inertial trackers for capturing the demonstrations, attaching sensors on workpieces and tools is impractical, and unrealistic, for some tasks. Using cameras as robot's 'eyes' and possibly other non-intrusive cameras or sensors located on robot's structure, combined with efficient sensor fusion techniques, can be used for the perception step of some embodiments. For reproduction of most of the tasks by robots it is important to incorporate visual feedback.

In some embodiments, the information from cameras is complemented with learning the forces of interaction between the robot and the environment. The perception of the demonstration then includes tactile sensors attached to the end-effector of the robot or to the manipulated object, in order to measure the forces of interaction with the environment. Force feedback control methods can be used to control the forces applied to the object or to the environment based on the information from the tactile sensors.

In other preferred embodiments, different smoothers can be used for the purpose of generalization of demonstrated tasks trajectories. As can be understood by a person skilled in the art, hidden Markov models can be used to perform similar generalization as the Kalman smoother, but with the use of discrete hidden variables. Various other methods can be used to obtain smooth and/or generalized trajectories, including, without limitations, Gaussian mixture regressions or dynamical systems generalization approaches.

In some preferred embodiments, prior information on the object or on the task can be included as constraints in the optimization process. For example, in a task that would consist of painting by moving a spray gun, supplemental constraints could be used to maintain constant distance between the tool (gun) and the surface. Since human motions are inherently random, a human demonstrator will not be able to maintain a constant distance between the tool and the surface. However, task defining may include parameters based on the end-user's understanding of the specific application. Several other motion types may be improved by such task definition parameters, for example and without limitation, the rotational movements with a fixed axis for securing a bolt or a nut, or limitations on velocity changes for moving open liquid containers.

In yet another preferred embodiment, multiple cameras may be used for perception of the demonstrations. Multiple cameras may provide more accurate and reliable trajectories tracking during the demonstrations. For example, in case of occlusions of some parts of the manipulated object in the view space of one camera, the use of multiple cameras can improve the perception of the motions by providing a line of view with a least one camera. Information from multiple cameras may be fused through an algorithm prior to the optimization process.

Similarly, multiple cameras may be used for IBVS during the execution of the task by the robot. In such case, information from the multiple cameras could be fused using various algorithms to provide feedback for the visual servoing method.

Preferred embodiments of the present invention include the use of this invention for various industrial applications, including, without limitation, for PbD of industrial robots whereas a task is demonstrated for the robot on a production chain, and the robot then reproduces the same task for production of goods. Also, the robots using the method presented herein can be of various shape and forms, they can be arm-type robots with an end-effector, but the method can be applied to various robots possessing an end-effector or other means of manipulating an object.

Embodiments of the invention also include what is described in the appended claims. As many changes can be made to the preferred embodiment of the invention without departing from the scope thereof; it is intended that all matter contained herein be considered illustrative of the invention and not in a limiting sense.

What is claimed is:

1. A method of programming at least one robot by demonstration comprising:
    performing at least one set of demonstrations of at least one task in the field of view of at least one fixed camera to obtain at least one set of observed task trajectories of at least one manipulated object;
    generating a generalized task trajectory from said at least one set of observed task trajectories; and
    executing said at least one task by said at least one robot in the field of view of said at least one fixed camera, using image-based visual servoing to minimize the difference between an observed trajectory during said execution and the generalized task trajectory;
    wherein Cartesian positions and velocities of said at least one manipulated object are calculated from image measurements from said at least one set of observed task trajectories, and said image-based visual servoing comprises following said Cartesian positions and velocities of said at least one manipulated object by minimizing the difference between said observed task trajectory during said execution and the generalized task trajectory.

2. The method of claim 1, whereas a reference task trajectory is obtained by performing a smoothing of said set of observed task trajectories.

3. The method of claim 2, whereas said smoothing is performed using a smoothing method selected from a group consisting of Kalman smoothing, hidden Markov model filtering, Gaussian mixture regression, dynamical systems smoothing and filtering.

4. The method of claim 2, whereas said generalized task trajectory is obtained by performing a second order conic optimization of the reference task trajectory within a set of constraints imposed on said set of observed task trajectories and said at least one robot.

5. The method of claim 4, whereas said constraints limit the generalized task trajectory to the field of view of said at least one camera.

6. The method of claim 4, whereas said constraints limit the generalized task trajectory to the dexterous workspace of said at least one robot.

7. The method of claim 4, whereas said constraints limit the maximum velocity of at least one end-effector of said at least one robot.

8. The method of claim 1, whereas said at least one camera further comprises at least one sensor for the perception of depth of pixels for each image acquired from said at least one camera.

9. The method of claim 8, whereas said depth of said pixels provides depth information on said set of observed task trajectories and during said image-based visual servoing.

10. The method of claim 1, whereas said at least one robot further comprises at least one tactile force sensor for monitoring tactile force during said execution of said task by said at least one robot.

11. The method of claim 1 wherein:

at least one demonstration of said at least one task is performed; and said at least one fixed camera obtains at least one observed task trajectory by observation of said at least one demonstration.

12. A system for executing at least one task learned by observation of at least one set of demonstrations, comprising:

at least one robot with at least one movable end-effector;

at least one object to be manipulated by the at least one end-effector;

at least one fixed camera for observing said at least one set of demonstrations of the at least one task, resulting in at least one set of observed task trajectories, and observing the execution of said at least one task by said at least one robot;

at least one processing unit for generating a generalized task trajectory from said at least one set of observed task trajectories;

at least one controller for servoing said at least one robot to reproduce the task with its end-effector in the field of view of said at least one said fixed camera using image-based visual servoing to minimize the difference between the observed trajectory during the execution and the generalized task trajectory, whereas a reference task trajectory is obtained by performing a smoothing of said set of observed task trajectories, and whereas said generalized task trajectory is obtained by performing a second order conic optimization of the reference task trajectory within a set of constraints imposed on said observed task trajectories and said at least one robot.

13. The system of claim 12, whereas said controller and said processing unit are combined in a single computer.

14. The system of claim 12, whereas said image-based visual servoing is programmed so as to minimize the difference between the observed trajectories during said execution and the generalized task trajectory.

15. The system of claim 12, whereas said smoothing is performed using a smoothing method selected from a group consisting of Kalman smoother, hidden-Markov model smoother, Gaussian mixture regression, dynamical systems smoothing and filtering.

16. The system of claim 12, whereas said at least one robot, cameras, processing unit and controller are integrated into a single device.

17. The system of claim 12, whereas said at least one camera includes at least one sensor for perception of the depth of pixels for each image acquired from said at least one camera.

18. The system of claim 12 wherein:

said at least one task is learned by observation of at least one demonstration; and said observation results in at least one observed task trajectory.

* * * * *